(12) United States Patent
Black-Ziegelbein et al.

(10) Patent No.: US 8,588,587 B2
(45) Date of Patent: Nov. 19, 2013

(54) NAVIGATION INTERFACE WITH GHOST REGION

(75) Inventors: Elizabeth A. Black-Ziegelbein, Iowa City, IA (US); Sarah M. Peck, Cary, NC (US); McGill Quinn, Durham, NC (US); Michael J. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 12/827,743

(22) Filed: Jun. 30, 2010

(65) Prior Publication Data

US 2012/0002937 A1 Jan. 5, 2012

(51) Int. Cl.
*H04N 9/80* (2006.01)

(52) U.S. Cl.
USPC .......................................... 386/248; 386/240

(58) Field of Classification Search
USPC .................... 386/240–241, 248, 291
See application file for complete search history.

(56) References Cited

U.S. PATENT DOCUMENTS

| 5,553,225 | A | 9/1996 | Perry | |
|---|---|---|---|---|
| 6,609,085 | B1 | 8/2003 | Uemura et al. | |
| 7,031,596 | B2 * | 4/2006 | Sai et al. | 386/241 |
| 7,310,652 | B1 | 12/2007 | Zaifman et al. | |
| 7,433,527 | B2 | 10/2008 | Takayama et al. | |
| 7,461,023 | B1 | 12/2008 | Helweg | |
| 2008/0180394 | A1 * | 7/2008 | Yun et al. | 345/157 |
| 2010/0131987 | A1 * | 5/2010 | Kent et al. | 725/55 |
| 2011/0091182 | A1 * | 4/2011 | Look et al. | 386/200 |

* cited by examiner

*Primary Examiner* — Thai Tran
*Assistant Examiner* — Nigar Chowdhury
(74) *Attorney, Agent, or Firm* — Jeffrey T. Holman

(57) ABSTRACT

An implementation is described for navigating media. The implementation includes displaying a portion of the media. The implementation also includes displaying a navigation interface corresponding to the media. The navigation interface includes an active region, a current view region, and a ghost region. The active region corresponds to at least a portion of the media. The current view region corresponds to a portion of the media to be displayed. The current view is at least partially defined by a selector handle. The ghost region is coupled to the active region. The ghost region represents a range of remaining media other than the portion of the media in the active region. The ghost area provides a context for the remaining media relative to the portion of the media corresponding to the active region. The implementation also includes receiving user input to navigate the media according to a visual interaction between the sector handle and the ghost region.

20 Claims, 9 Drawing Sheets

NAVIGATION INTERFACE WITH GHOST REGION

BACKGROUND

Analysis of images, media, and data is a useful tool in many fields of endeavor. In many instances, the media being viewed may be too large to see all at once. For example, the media may be a large image or long video or audio sequence. Other examples might be a long-time data trend for a stock price or other large sets of data. Conventional solutions, which allow a user to navigate this media, commonly employ sliders or other navigation interfaces. Frequently, it is beneficial or necessary to zoom in on a specific sub-set of the media such as frames in a video or sections of a sound track to get a higher resolution.

FIG. 1 illustrates one embodiment of a conventional navigation interface 10. The illustrated embodiment includes a scale 12, a selector 14, and jump arrows 16. The resolution of the scale 12 corresponds to some density of media. In the illustrated embodiment, the scale 12 corresponds to data between Point A and Point B. The selector 14 corresponds to a portion of the media that is displayed to a user (not shown). The user may drag either side of the selector 14 to vary the amount of the scale 12 that is selected and, hence, the amount of media that is displayed to the user. The jump arrows 16 at either end of the scale 12 are configured to allow the user to scroll through the available media.

However, the illustrated conventional system 10 lacks the ability to present the overall context of the total media when zoomed in to evaluate or analyze the media. For example, when zoomed in on a portion of a video frameset, the context for how that frameset corresponds with the rest of the video sequence is lost. Additionally, in another example, when viewing a portion of a stock price history corresponding to a few weeks, the context of the few weeks relative to the data pertaining to the stock price trend over several years is also lost. Alternatively, if the user zooms out to display the entire set of media, the granularity of the scale 12 decreases. Thus, it is difficult to maintain sufficient granularity of the scale and to view an overall context of the displayed media at the same time.

SUMMARY

Embodiments of a computer program product are described. In one embodiment, the computer program product includes a computer useable storage medium to store a computer readable program for navigating media. The computer readable program, when executed on a computer, causes the computer to perform operations. The operations include displaying a portion of the media. The operations also include displaying a navigation interface corresponding to the media. The navigation interface includes an active region, a current view region, and a ghost region. The active region corresponds to at least a portion of the media. The current view region corresponds to a portion of the media to be displayed. The current view is at least partially defined by a selector handle. The ghost region is coupled to the active region. The ghost region represents a range of remaining media other than the portion of the media in the active region. The ghost area provides a context for the remaining media relative to the portion of the media corresponding to the active region. The operations also include receiving user input to navigate the media according to a visual interaction between the selector handle and the ghost region. Other embodiments of the computer program product are also described.

Embodiments of a method are also described. In one embodiment, the method is a method for navigating media. The method includes displaying a portion of the media. The method also includes displaying a navigation interface corresponding to the media. The navigation interface includes an active region, a current view region, and a ghost region. The active region corresponds to at least a portion of the media. The current view region corresponds to a portion of the media to be displayed. The current view is at least partially defined by a selector handle. The ghost region is coupled to the active region. The ghost region represents a range of remaining media other than the portion of the media in the active region. The ghost area provides a context for the remaining media relative to the portion of the media corresponding to the active region. The method also includes receiving user input to navigate the media according to a visual interaction between the selector handle and the ghost region. Other embodiments of the method are also described.

Embodiments of a system are also described. In one embodiment, the system is a system for navigating media. The system includes a data storage device, a display device, a user interface input device, and a processor. The data storage device stores data. The display device is coupled to the data storage device. The display device displays at least a portion of the media and a navigation interface corresponding to the media. The user interface input device facilitates a user input to the navigation interface displayed on the display device. The processor is coupled to the user interface input device. The processor receives the user input and navigates the media via the navigation interface. The navigation interface includes an active region, a current view region, and a ghost region. The active region corresponds to at least a portion of the media. The current view region corresponds to a portion of the media to be displayed. The current view is at least partially defined by a selector handle. The ghost region is coupled to the active region. The ghost region represents a range of remaining media other than the portion of the media in the active region. The ghost area provides a context for the remaining media relative to the portion of the media corresponding to the active region. The processor also navigates the media according to a visual interaction between the selector handle and the ghost region. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION

Figure 1:
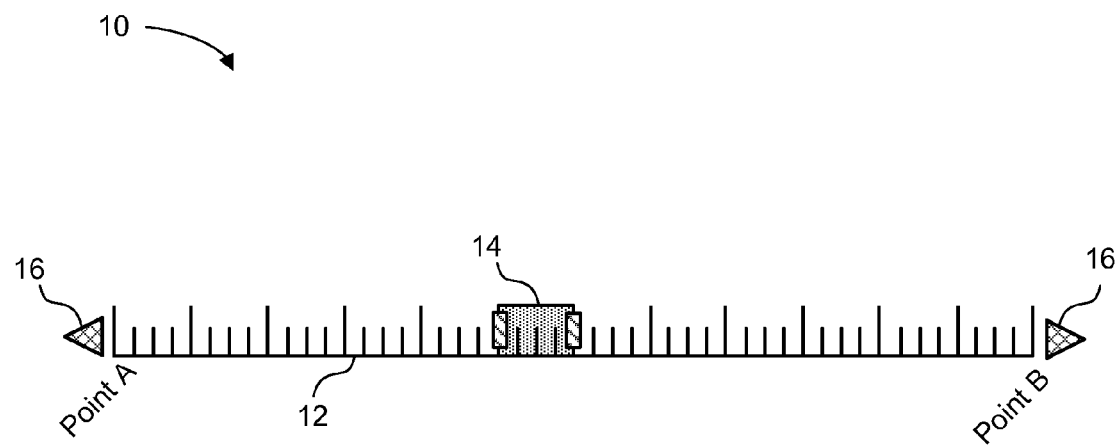
FIG. 1 depicts a schematic diagram of a conventional navigation interface.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to display the media and display a navigation interface corresponding to the media. The navigation interface includes an active region, a current view region, and a ghost region. The active region corresponds to at least a portion of the media. The current view region corresponds to a portion of the media to be displayed. The current view is at least partially defined by a selector handle. The ghost region is coupled to the active region. The ghost region represents and provides context for a range of at least some of the media other than the portion of the media in the active region. The selector handle is interactive with the ghost region to modify the current view region and the active region.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate navigation of media with a navigation interface. In many embodiments, the navigation interface is referred to as a slider bar, although some embodiments may be implemented in other formats. The slider bar has several regions. The regions include a current view region, and active region, and a ghost region. The current view region of the slider bar corresponds to the media on the display. The active region includes the current view region and some of the media which is not within the current view region. The ghost region corresponds to some or all of the remaining media that is not associated with the active region. The ghost region allows a user to have context for the displayed media.

In some embodiments, the ghost region truncates at least a portion of the media that is not included in the active region or the current view region. By allowing the user to see what media is available, the user can have an understanding of how the displayed media fits into the rest of the available media. The ghost region also provides interactive functionality to allow the user to scroll into that remaining media with a simple user input operation.

Generally, the current view region might be defined by two slider handles that can be moved independently to form the current view region between them. Alternatively, other artifacts can be used to control the current view region. In the case of the slider handles, the user can drag a slider handle into the ghost region to scroll the media from the ghost region into the active region and/or the current view region. In some embodiments, the user may navigate the entirety of the media within the ghost region, the active region, and the current view region with a single input. Thus, the user is able to maintain the context of the total media while viewing a small-scale selection in a single large media range while maintaining the ability to scroll, zoom, and search through the available media with the use of one or more ghost areas.

Thus, at least some of the described embodiments facilitate navigating media with a navigation interface (e.g., slider bar)

having a ghost region. Additionally, at least some of the described embodiments facilitate maintaining a context of a displayed portion of a media with respect to the rest of the media during zooming, scrolling, or other navigation operations. Although not limiting in all embodiments, the term "media" may refer to a video or image, a sound track or music file, a dataset over a time period, a dataset of multiple variables, or any other type of computer viewable file. In other words, a media, in some embodiments, is any object that relays information to a user.

In some embodiments, the media has a structure of fundamental units. For example, a video may have units of frames, an image may have units of pixels or coordinates, a data set may have units of individual data points, etc. In some embodiments, the media can be navigated based on its corresponding fundamental units. For example, a user may scroll through a video by frames. Additionally, the fundamental units may be in a hierarchy. For example, a document may have sections which contain chapters, the chapters may contain pages, the pages may contain lines, etc.

Figure 2:
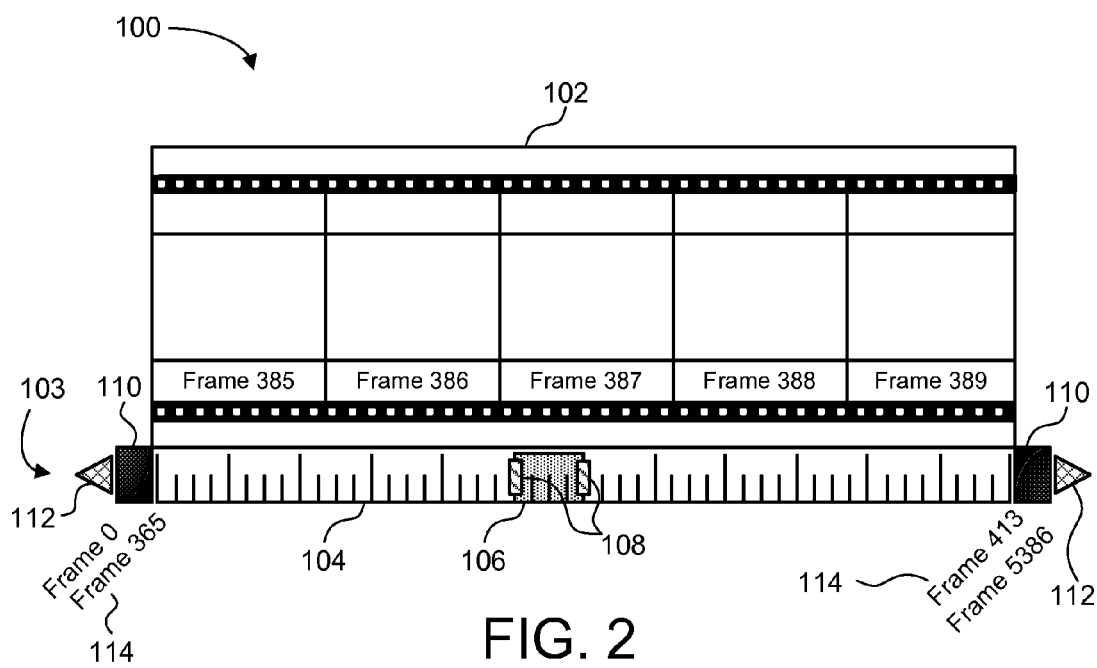
FIG. 2 depicts a schematic diagram of one embodiment of a media interface for navigating media.

FIG. 2 depicts a schematic diagram of one embodiment of a media interface 100 for navigating media. In the illustrated embodiment, the media interface 100 includes a media display window 102 and a navigation interface 103. The navigation interface 103 includes an active region 104, current view region 106, selector handles 108, ghost regions 110, jump arrows 112, and media labels 114. The media display window 102 is configured to display a portion of the full media which corresponds to the current view region 106 defined by the portion of the active region 104 between the selector handles 108.

In the illustrated embodiment, the media is a video sequence of frames. In other embodiments, the media may be a sound track, a set of data points, or any other displayable media. The selector handles 108 define a current view region 106 that includes frames 385 to 389. This is a subset of a portion of the media represented by the active region 104. The active region 104 corresponds to a portion of the media ranging from frame 365 to frame 413 as indicated by the media labels 114 at the inside edges of the ghost regions 110.

The ghost regions 110 are representative of portions of the media other than the active portion related to the active region 104 and the current view region 106. For convenience, this portion of the media is referred to as the remaining media. In the illustrated embodiment, the ghost regions 110 have media labels 114 to display the range of remaining media that corresponds to the ghost regions 110. Specifically, the ghost region 110 on the left side of the active region 104 represents frames 0-365, and the ghost region 110 on the right side of the active region 104 represents frames 413-5386. In some embodiments, the range of media in the ghost regions 110 is represented with other indicators. For example, each of the ghost regions 110 may have a visual indication of the fractional amount of the media represented by each of the ghost regions 110, such as a color that fills each of the ghost areas 110.

In other embodiments, the ghost areas 110 may change physical size depending on the amount of media represented. For example, with reference to FIG. 2, the ghost region 110 on the left side of the active region 104 may be smaller than the ghost region 110 on the right side of the active region 104, because the ghost region 110 on the left side represents about 6.8% of the overall media while the ghost region 110 on the right side of the active region 104 represents about 92.3%.

The media labels 114 indicate that media interface 100 corresponds to the full media, which is between frame 0 and frame 5386 for the illustrated embodiment. In some embodiments, the jump arrows 112 allow the active area corresponding to the active region 104 to jump one full length of the active region 104. For example, in the case of a jump to the left, the point (frame 365) previously associated with the left side of the active region 104 would then be associated with the right side of the active region 104 and a new section (frame 317 to frame 365) of the media would be associated with the active region 104. In other embodiments, the jump arrows 112 scroll the active region 104 based on the duration of the input to the jump arrows 112 or another user-configurable parameter. In some embodiments, the selector handles 108 also have media labels 114 to indicate the portion of the media that corresponds to the current view region 106 between the selector handles 108.

Although the active region 104 is shown with vertical tick marks, other embodiments have a smooth scale without marks. In some embodiments, the active region 104 includes visual markers (e.g., tick marks) to correspond to fundamental units of the media. In some embodiments, the visual markers facilitate one-to-one mapping of the displayed media in the media display window relative to the active region 104.

Figure 3:
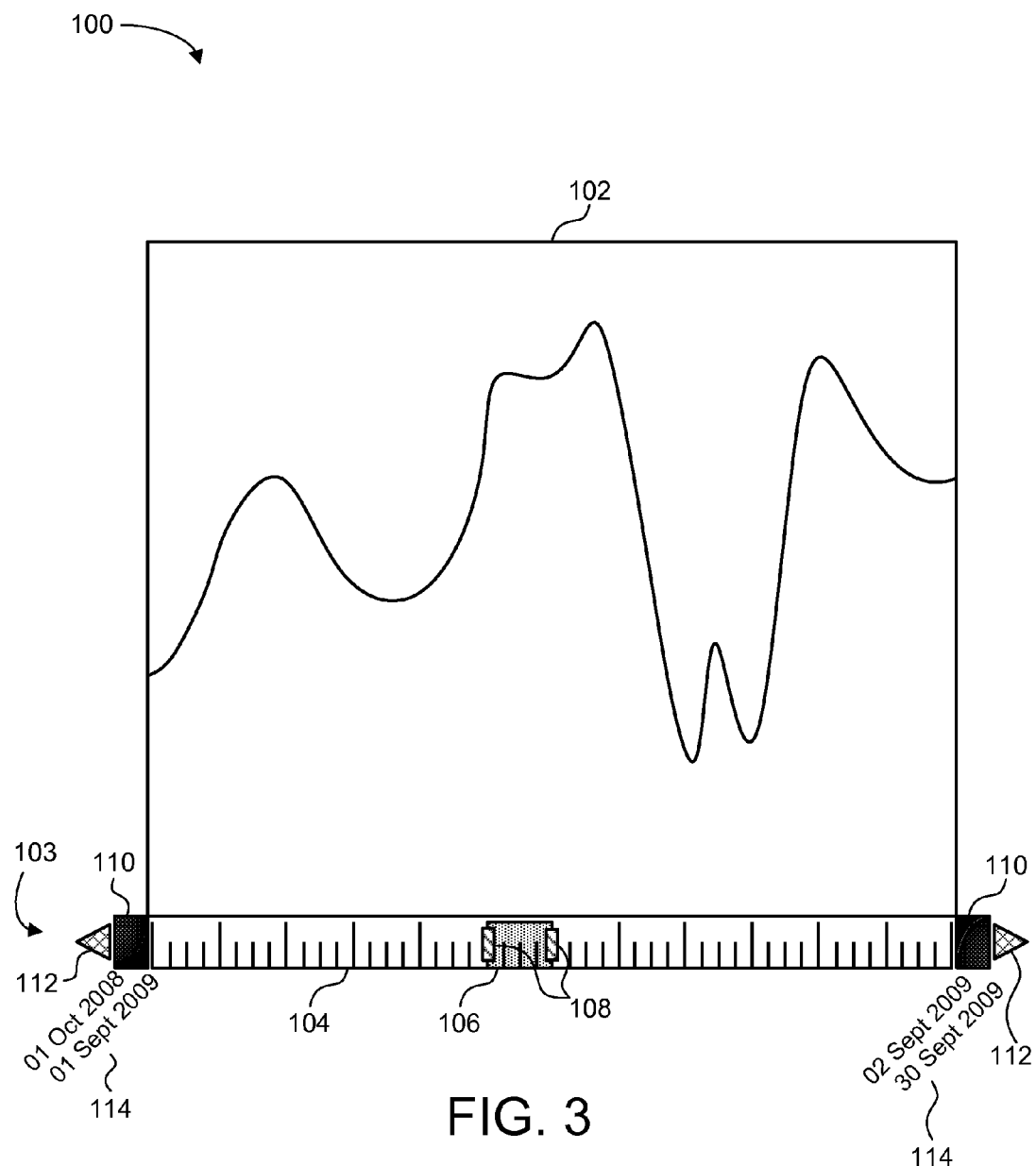
FIG. 3 depicts a schematic diagram of another embodiment of a media interface for navigating media.

FIG. 3 depicts a schematic diagram of another embodiment of a media interface 100 for navigating media. In the illustrated embodiment, the media is a dataset varying with time. The media includes data points between the dates of 1 Oct. 2008 to 30 Sep. 2009. In the illustrated embodiment, the date of 1 Sep. 2009 is shown in the active region 104. The remaining media corresponds to the dates of 1 Oct. 2008 to 1 Sep. 2009 and 2 Sep. 2009 to 30 Sep. 2009 which are included in the corresponding ghost areas 110. Each of the larger tick marks of the active region 104 represent 2 hours while the smaller tick marks represent 30 minute intervals. Thus, the current view region 106 between the selector handles 108 corresponds to approximately a 2-hour portion of the media. The 2-hour portion in the current view region 106 corresponds to the media displayed in the display 102. The jump arrows 112 may be used, as explained above, to scroll the active region 104 so that active region 104 corresponds to the time between 31 Aug. 2009 and 1 Sep. 2009. In another embodiment, the jump arrows 112 increase the span of the active region 104. For example, the jump arrows 112 may be configured to increase the active region 104 by one or more units in the corresponding direction while maintaining the other boundary at a fixed position. Other embodiments are configured to produce different navigation, scrolling, or other effects in response to activation of the jump arrows 112.

Figure 4:
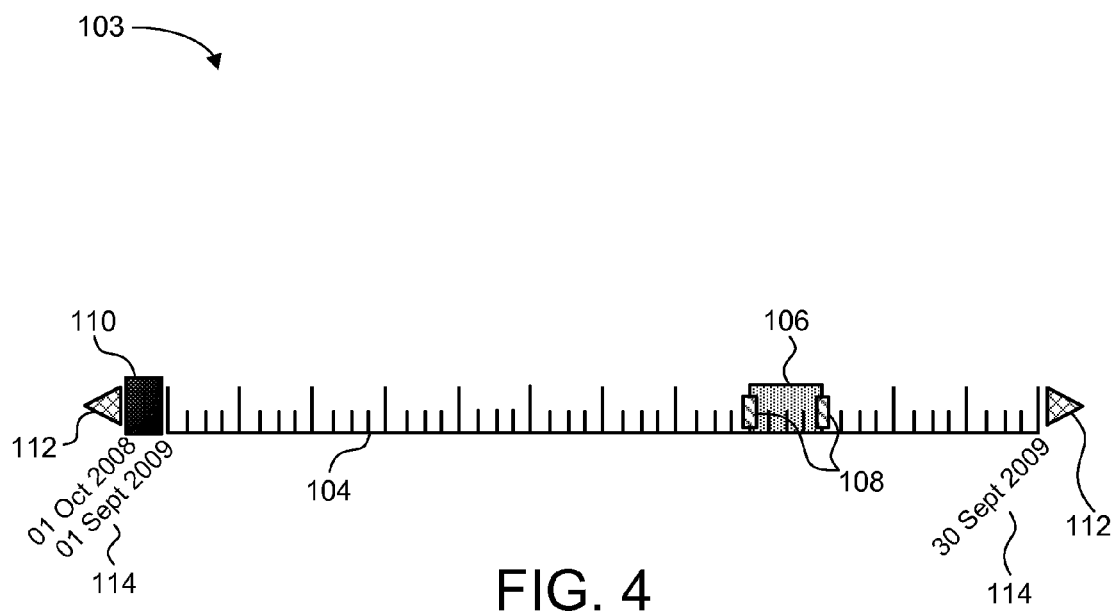
FIG. 4 depicts a schematic diagram of another embodiment of the navigation interface of FIG. 3.

FIG. 4 depicts a schematic diagram of another embodiment of the navigation interface 103 of FIG. 3. In the illustrated embodiment, the active region 104 is scrolled to include a portion of the media between the dates 1 Sep. 2009 and 30 Sep. 2009. In some embodiments, in response to reaching one of the extreme ends of the media, the corresponding ghost region 110 disappears. In other embodiments, the ghost region 110 remains but becomes inactive, and the corresponding media label 114 is modified to indicate the end of the media range. In some embodiments, in response to reaching the extreme end of the media, the jump arrow 112 corresponding to that side of the navigation interface 103 deactivates and/or disappears.

Figure 5A:
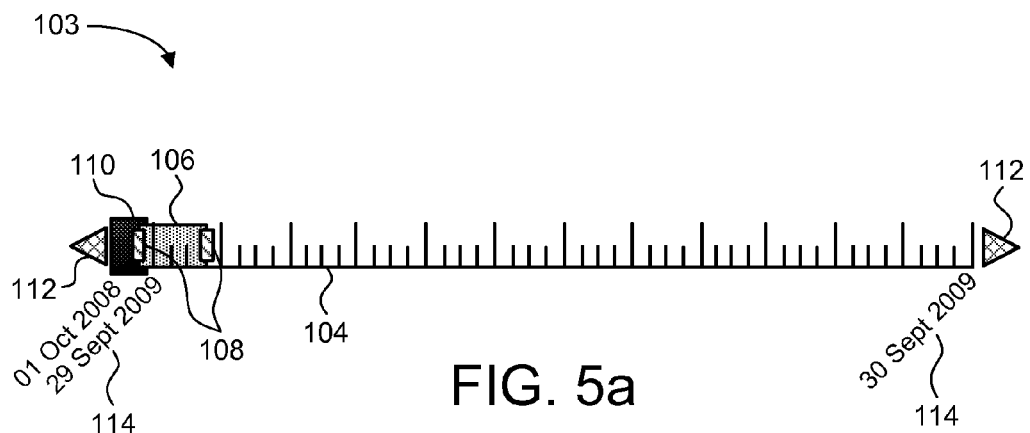
FIGS. 5a and 5b depict schematic diagrams of embodiments of the scrolling feature of the navigation interface of FIG. 3.
Figure 5B:
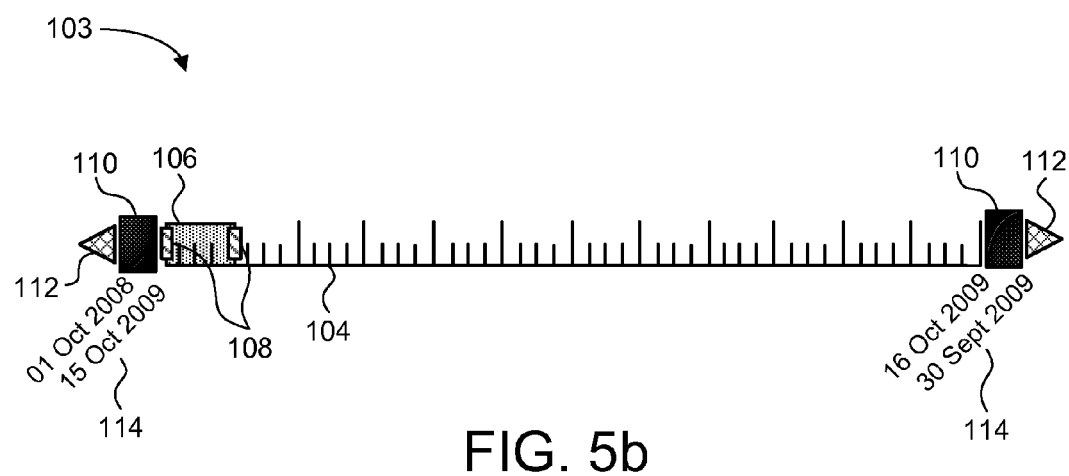

FIGS. 5a and 5b depict schematic diagrams of embodiments of the scrolling feature of the navigation interface 103 of FIG. 3. In the illustrated embodiment of FIG. 5a, the current view region 106 is moved to the left side of the active region 104. The entire current view region 106 is dragged to the left, and the left selector handle 108 is held over the ghost region 110. In the illustrated embodiment, the current view region 106 is dragged as a whole with a fixed media range (i.e., the corresponding media range between the selector handles remains at 2 hours). In response to dragging the left selector handle 108 of the current view region 106 over the ghost region 110, the navigation interface 103 scrolls media out of the corresponding ghost region 110 and into the current view region 106. In some embodiments, the active region 104 is also resized to accommodate the scrolled media. Alternatively, the active region 104 may scroll or be modified in another way to accommodate the added portion from the ghost region 110. In the illustrated embodiment of FIG. 5b, when the current view region 106 is released, the current view region 106 snaps back into the active region 104, selecting the time range within the active region 104 closest to the end of the scrolling direction. This selects a new range for the current view area 106 to be displayed. In response, the active region 104 resizes (or scrolls) to accommodate the new size of the current view region 106. Additionally, the ghost region 110 at the opposite end of the active region 104 may be updated to include any media moved from the active region 104 to the current view region 106. In this way, the ghost region 110 is populated with a new range of remaining media.

Figure 6A:
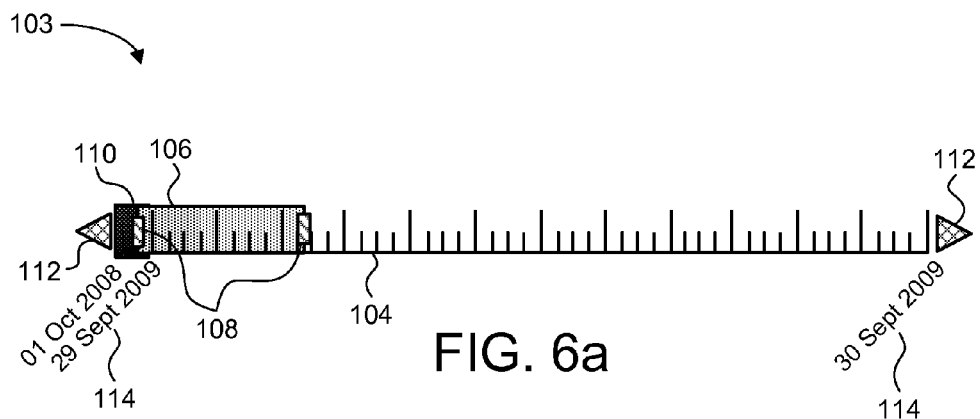
FIGS. 6a and 6b depict schematic diagrams of other embodiments of the scrolling feature of the navigation interface of FIG. 3.
Figure 6B:
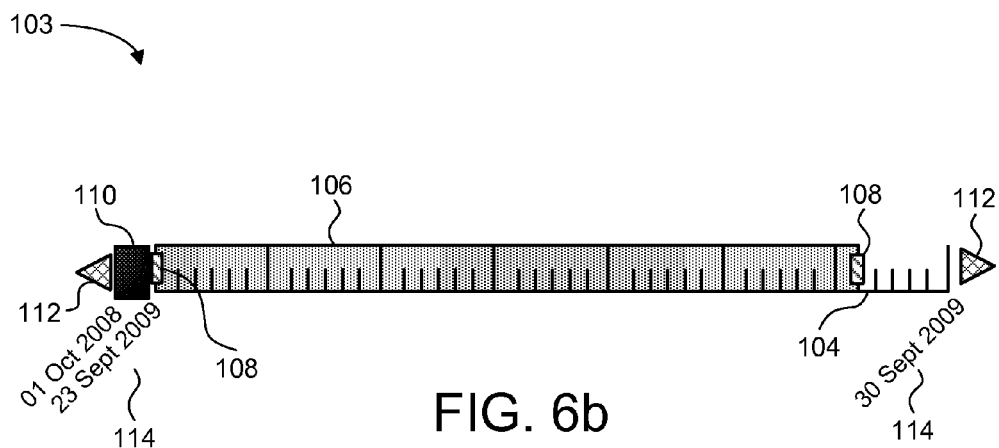

FIGS. 6a and 6b depict a schematic diagram of another embodiment of the scrolling feature of the navigation interface 103 of FIG. 3. In the illustrated embodiment of FIG. 6a, the left-hand selector handle 108 is dragged over the left-hand ghost region 110. In response, the left-hand ghost region 110 scrolls media from the ghost region 110 into the current view region 106. In some embodiments, the range of the media scrolled into the current view region 106 is dependent upon the amount of time the left-hand selector handle 108 is held over the left-hand ghost region 110. As the media range of the current view region 106 is increased, the active region 104 is scaled by the navigation interface 103 to maintain a uniform scale throughout the active region 104 and the current view region 106. As a result, in FIG. 6b, the right-hand selector handle 108 appears to move towards the right-hand side of the navigation interface 103. For example, in FIG. 6b, after scrolling, the active region 104 encompasses approximately a week's time, and the current view region 106 encompasses from about the morning of 23 Sep. 2009 to the morning of 29 Sep. 2009. As a specific example, the active region 104 of FIG. 6b may include from 12:00 am of 23 Sep. 2009 to 11:59 pm of 29 Sep. 2009 while the current view region 106 includes from 12:00 am of 23 Sep. 2009 to 4:00 am of 29 Sep. 2009.

Figure 7A:
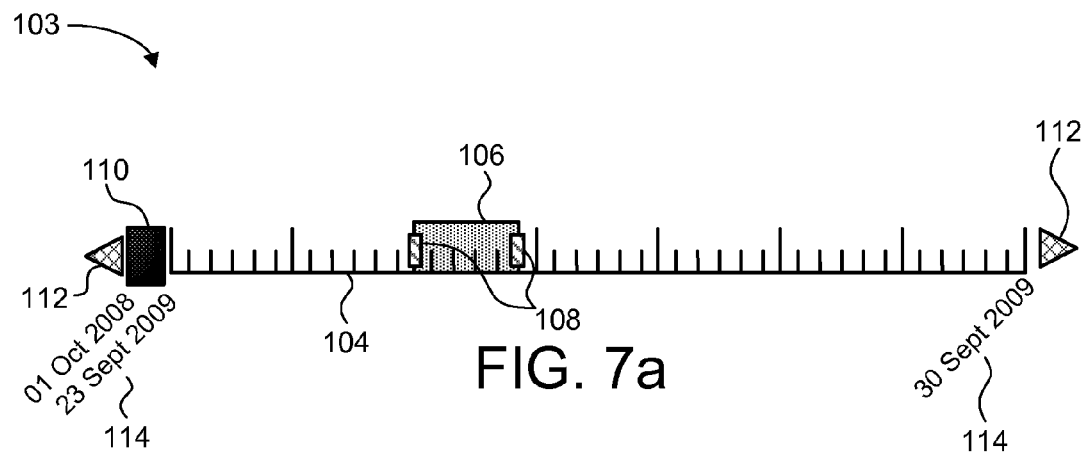
FIGS. 7a and 7b depict schematic diagrams of embodiments of the resizing feature of the navigation interface of FIG. 3.
Figure 7B:
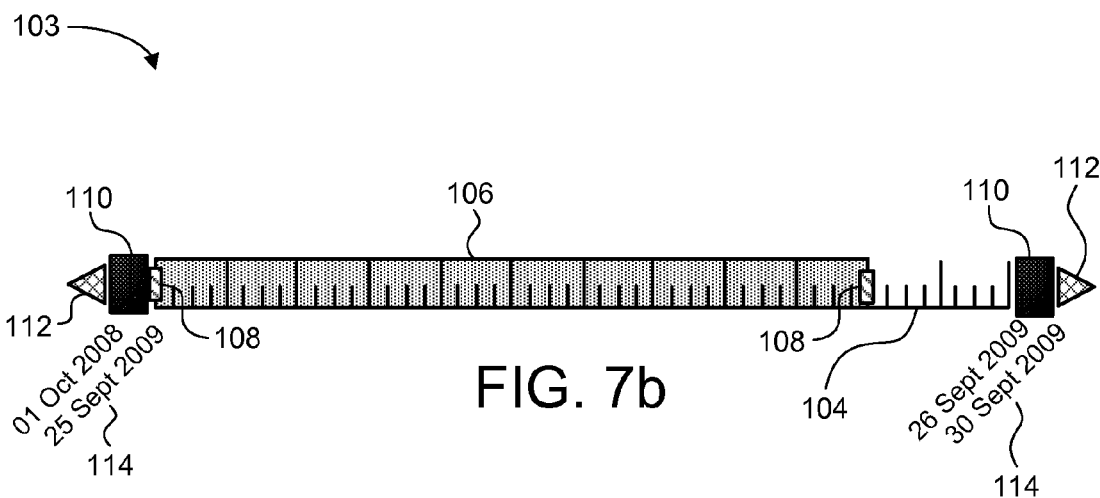

FIGS. 7a and 7b depict a schematic diagram of one embodiment of the resizing feature of the navigation interface 103 of FIG. 3. In the illustrated embodiment of FIG. 7a, the current view region 106 is a relatively small percentage of the active region 104. The active region 104 spans about a week's worth of time for the media. In one embodiment, the navigation interface 103 is configured to resize the active region 104 based on a relative size of the current view region 106. For example, the active region 104 may be resized if the current view region 106 corresponds to less than 20% of the media encompassed by the active region 104. Other embodiments may use other percentage thresholds, or other types of thresholds. In the illustrated embodiment of FIG. 7b, the navigation interface 103 has resized the active region 104 to provide a higher resolution to the current view region 106, resulting in better mapping of the tick marks in the active region 104 of the media on the media display window 102 (see FIGS. 2 and 3). In some embodiments, by resizing the active region 104, a portion of the media from the active region 104 is moved into the corresponding ghost region 110. In the illustrated embodiment, both the left-hand and right-hand ghost regions 110 are modified to include more of the media which previously corresponded to the active region 104. In some embodiments, the navigation interface 103 resizes the active region 104 to the next largest fundamental unit. In other embodiments, the navigation interface 103 resizes the active region 104 to a certain distance from the selector handles 108. For example, the navigation interface 103 may center the current view region 106 within the active region 104. In another embodiment, the navigation interface 103 may resize the active region 104 to fit the ghost regions 110 at the selector handles 108 for increased or maximum resolution. Other embodiments may incorporate other resizing parameters.

Figure 8:
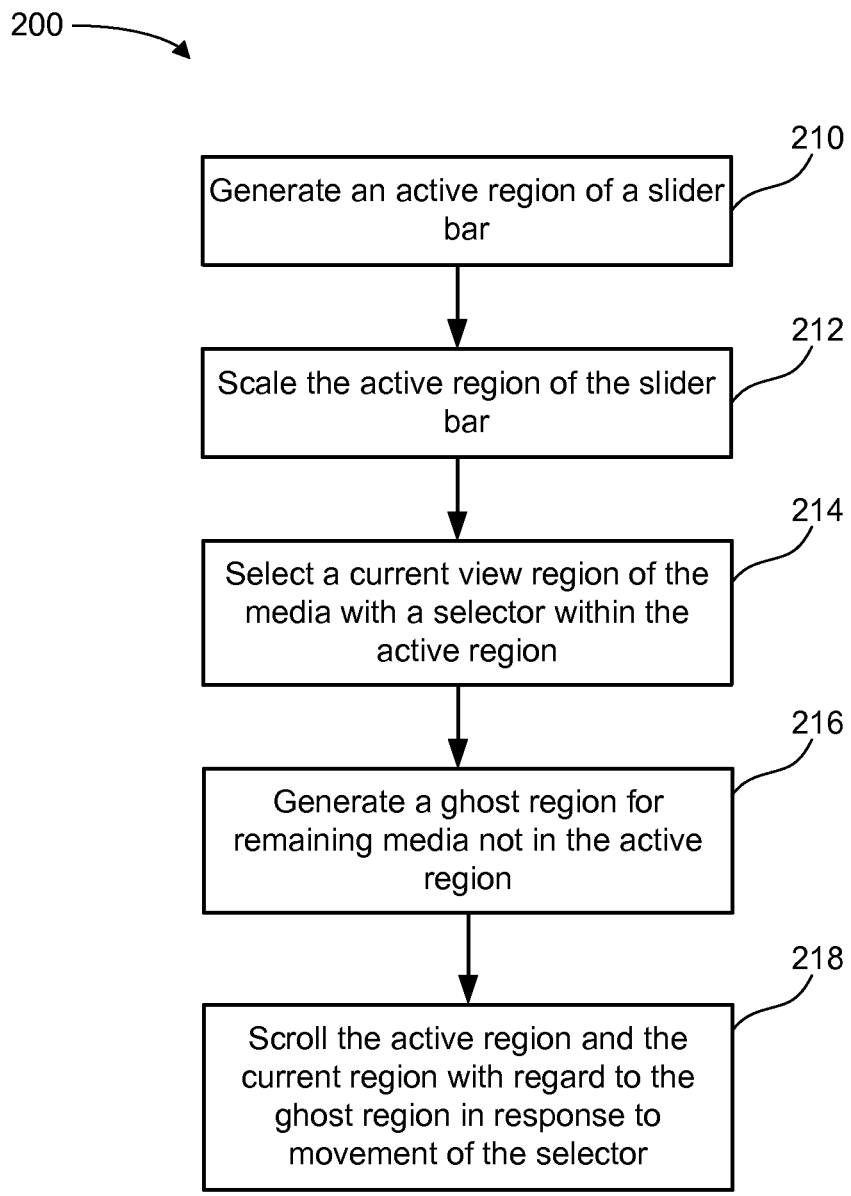
FIG. 8 illustrates one embodiment of a block diagram of a method for using a media interface.

FIG. 8 illustrates a block diagram of a method 200 for using a navigation interface 103. At block 210, the navigation interface 103 generates an active region 104 of a slider bar. At block 212, the active region 104 of the slider bar is scaled. At block 214, a current view region 106 of the media is selected with a selector handle 108 within the active region 104. At block 216, a ghost region 110 is generated for remaining media that is not represented by the active region 104. At block 218, the active region 104 and the current region 106 are scrolled with regard to the ghost region 110 in response to movement of the selector handle 108. The depicted method 200 then ends.

Figure 9:
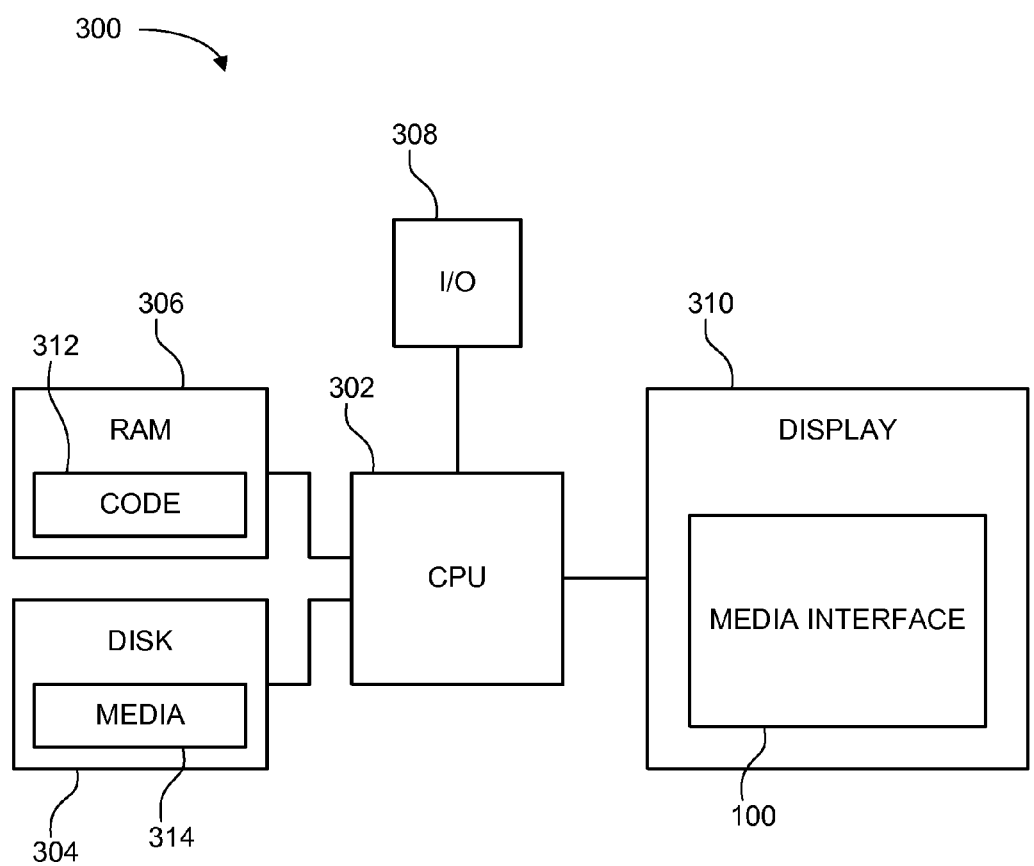
FIG. 9 illustrates one embodiment of a block diagram of a system for navigating media.

FIG. 9 illustrates one embodiments of a block diagram of a system 300 for navigating media. In the illustrated embodiment, the system 300 includes CPU 302, disk 304, RAM 306, input-output device 308, and display 310. The CPU 302 is coupled to the disk 304, the RAM 306, the input-output device 308, and the display 310. In some embodiments, the CPU 302 processes information and directs signals between the other components of the system 300. The disk 304 stores media 314 for use by the system 300. The RAM 306 is coupled to the CPU 302. Some embodiments of the RAM 306 are described below. The RAM 306 stores code 312. In some embodiments, the code 312 includes instructions for the processes executed by the CPU 302. In some embodiments, the input-output device 308 may be a mouse, keyboard, or touchpad. Other embodiments include other types of input-output devices as described below. The display 310 is coupled to the CPU 302. In some embodiments, the display is a computer screen. Other embodiments include other types of display devices. The display 310 is configured to display the media 314 in a media interface 100.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of a combination of hardware and software elements. In one embodiment, the invention is implemented in an electronic storage device containing software, which includes but is not limited to firmware, resident software, microcode, etc. Furthermore, embodiments of the invention can take the form of a computer program product accessible from a computer-usable or computer-readable storage medium providing program code for use by or in connection with a computer or any instruction execution system. For the purposes of this description, a computer-usable or computer-readable storage medium can be any apparatus that can contain or store the program for use by or in connection with the instruction execution system, apparatus, or device. Further, the computer-useable or computer-readable storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the system to become coupled to other data processing systems or remote printers or storage devices through intervening private or public networks. Modems, cable modems, and Ethernet cards are just a few of the currently available types of network adapters.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program for navigating media, wherein the computer readable program, when executed on a computer, causes the computer to perform operations comprising:
    displaying a portion of the media;
    displaying a navigation interface corresponding to the media, wherein the navigation interface comprises:
        an active region corresponding to at least a portion of the media, the active region having a first unit scale;
        a current view region of the active region, wherein the current view region corresponds to the displayed media, wherein the current view region is at least partially defined by a selector handle; and
        a ghost region adjacent to the active region, the ghost region to represent a range of remaining media other than the portion of the media corresponding to the active region, wherein the ghost region is configured to provide a context for the remaining media relative to the portion of the media corresponding to the active region, wherein the ghost region has a second unit scale substantially different from the first unit scale; and
    receiving user input to navigate the media according to a visual interaction between the selector handle and the ghost region.

2. The computer program product of claim 1, wherein the computer readable program, when executed on the computer, causes the computer to perform further operations comprising modifying the current view region and the active region in response to a single visual interaction between the selector handle and the ghost region.

3. The computer program product of claim 1, wherein the computer readable program, when executed on the computer, causes the computer to perform further operations comprising displaying a one-to-one mapping of the displayed media relative to the navigation interface, wherein the one-to-one mapping comprises a visual marker within the navigation interface for each fundamental unit within the media.

4. The computer program product of claim 1, wherein the computer readable program, when executed on the computer, causes the computer to perform further operations comprising modifying a scale of the active region based on a movement of the selector handle.

5. The computer program product of claim 1, wherein the computer readable program, when executed on the computer, causes the computer to perform further operations comprising modifying the ghost region having a size corresponding to an extent of the remaining media represented by the ghost region.

6. The computer program product of claim 1, wherein the computer readable program, when executed on the computer, causes the computer to perform further operations comprising displaying at least one media label within the navigation interface to denote an extent of the media corresponding to at least one of the active, current view, and ghost regions.

7. The computer program product of claim 1, wherein the media comprises at least one object of a list of objects, wherein the list of objects comprises:
    a website comprising a document model structure;
    a text document comprising lines;
    a spreadsheet comprising cells;
    an image comprising pixels;
    a set of data comprising at least one data point;
    a video comprising frames; and
    a sound file comprising units of time.

8. A method for navigating media, the method comprising:
    displaying a portion of the media;
    displaying a navigation interface corresponding to the media, wherein the navigation interface comprises:
        an active region corresponding to at least a portion of the media and having a first unit scale;
        a current view region of the active region, wherein the current view region corresponds to the displayed media, wherein the current view region is at least partially defined by a selector handle; and
        a ghost region adjacent to the active region and having a second unit scale substantially different from the first unit scale, the ghost region to represent a range of remaining media other than the portion of the media corresponding to the active region, wherein the ghost region is configured to provide a context for the remaining media relative to the portion of the media corresponding to the active region; and
    receiving user input to navigate the media according to a visual interaction between the selector handle and the ghost region.

9. The method of claim 8, wherein the user input to navigate the media comprises dragging the selector handle over the ghost region.

10. The method of claim 8, further comprising displaying a one-to-one mapping of the current view portion of the media with respect to the active region wherein the active region comprises a visual marker to correspond to each fundamental unit within the media.

11. The method of claim 8, further comprising resizing the active region based on a parameter of the current view region.

12. The method of claim 8, further comprising displaying a media label corresponding to at least one of the active, current view, and ghost regions to denote a location in the media.

13. The method of claim 8, further comprising modifying the ghost region to have a visual characteristic corresponding to an extent of the remaining media represented by the ghost region.

14. A system for navigating media, the system comprising:
    a data storage device to store data;
    a display device coupled to the data storage device, wherein the display device is configured to display at least a portion of the media and a navigation interface corresponding to the media;

a user interface input device to facilitate a user input to the navigation interface displayed on the display device; and a processor coupled to the user interface input device, wherein the processor is configured to receive the user input and navigate the media via the navigation interface, wherein the navigation interface comprises:

an active region corresponding to at least a portion of the media and having a first unit scale;

a current view region of the active region, wherein the current view region corresponds to the displayed media, wherein the current view region is at least partially defined by a selector handle; and a ghost region adjacent to the active region and having a second unit scale substantially different from the first unit scale, the ghost region to represent a range of remaining media other than the portion of the media corresponding to the active region, wherein the ghost region is configured to provide a context for the remaining media relative to the portion of the media corresponding to the active region;

wherein the processor navigates the media according to a visual interaction between the selector handle and the ghost region.

15. The system of claim 14, wherein the active region facilitates one-to-one mapping of the displayed media relative to the navigation interface, wherein the one-to-one mapping comprises a visual marker within the navigation interface for each fundamental unit within the media.

16. The system of claim 14, wherein the processor is configured to modify the current view region and the active region in response to a single visual interaction between the selector handle and the ghost region.

17. The system of claim 16, wherein the single visual interaction comprises dragging the selector handle over the ghost region.

18. The system of claim 14, wherein the processor is configured to generate at least one media label to denote a location in the media of at least one of the active, current view, and ghost regions.

19. The system of claim 14, wherein the processor is configured to resize the active region of the navigation interface based on a parameter of the current view region.

20. The system of claim 14, wherein the ghost region is configured to visually represent an extent of the remaining media represented by the ghost region.

* * * * *